(12) United States Patent
Vetro et al.

(10) Patent No.: US 7,013,149 B2
(45) Date of Patent: Mar. 14, 2006

(54) ENVIRONMENT AWARE SERVICES FOR MOBILE DEVICES

(75) Inventors: Anthony Vetro, Short Hills, NJ (US); Zafer Sahinoglu, Clifton, NJ (US); Ghulam Bhatti, Union, NJ (US); Johnas Cukier, Chester, NY (US); Fernando Matsubara, Gillette, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 550 days.

(21) Appl. No.: 10/120,947

(22) Filed: Apr. 11, 2002

(65) Prior Publication Data

US 2004/0203851 A1 Oct. 14, 2004

(51) Int. Cl.
*H04Q 7/20* (2006.01)
*H04Q 7/00* (2006.01)
*H04M 3/42* (2006.01)

(52) U.S. Cl. ............... 455/456.1; 455/415; 455/445; 370/329; 370/331; 370/328

(58) Field of Classification Search ........ 455/426, 455/412.1, 450, 509, 414.1, 456.1, 415, 445; 709/221, 223, 328; 370/352, 401, 328, 522, 370/231, 335, 329, 331
See application file for complete search history.

(56) References Cited

U.S. PATENT DOCUMENTS

| | | | |
|---|---|---|---|
| 5,642,303 A | | 6/1997 | Small |
| 5,751,338 A | * | 5/1998 | Ludwig, Jr. ............... 348/14.12 |
| 6,133,867 A | | 10/2000 | Eberwine |
| 6,161,008 A | * | 12/2000 | Lee et al. .................... 455/415 |
| 6,222,829 B1 | * | 4/2001 | Karlsson et al. ............ 370/329 |
| 6,256,300 B1 | * | 7/2001 | Ahmed et al. .............. 370/331 |
| 6,275,773 B1 | | 8/2001 | Lemelson |
| 6,298,306 B1 | | 10/2001 | Suarez |
| 6,314,302 B1 | * | 11/2001 | Haferbeck et al. ........ 455/550.1 |
| 6,331,817 B1 | | 12/2001 | Goldberg |
| 6,348,889 B1 | | 2/2002 | Ashihara |
| 6,349,259 B1 | | 2/2002 | Sato |
| 6,408,272 B1 | * | 6/2002 | White et al. .............. 704/270.1 |
| 6,567,667 B1 | * | 5/2003 | Gupta et al. ................. 455/445 |
| 6,678,361 B1 | * | 1/2004 | Rooke et al. ............ 379/93.24 |
| 6,690,659 B1 | * | 2/2004 | Ahmed et al. .............. 370/328 |

(Continued)

FOREIGN PATENT DOCUMENTS

WO  WO 01/60083  8/2001

OTHER PUBLICATIONS

Catovic et al., "Geolocation Updating Scheme For Location Aware Services in Wireless Networks," Proc. MobiCom'01, 2001.

(Continued)

*Primary Examiner*—William Trost
*Assistant Examiner*—Kiet Doan
(74) *Attorney, Agent, or Firm*—Dirk Brinkman; Andrew J. Curtin (57) ABSTRACT

A system delivers multimedia services to mobile devices via a network by first registering a mobile device with a service manager connected to the mobile device via the network. Application service providers are connected to the service manager via the network. Each application service provider is associated with particular multimedia services. An environment description to be associated with the mobile device is acquired, and a particular application service provider is identified according to the environment description, and then selected services provided by the particular application service provider are delivered to the mobile device according to the environment description via the network.

27 Claims, 3 Drawing Sheets

U.S. PATENT DOCUMENTS

| | | | |
|---|---|---|---|
| 6,747,961 B1 * | 6/2004 | Ahmed et al. | 370/328 |
| 6,845,398 B1 * | 1/2005 | Galensky et al. | 709/231 |
| 2002/0078228 A1 * | 6/2002 | Kuisma et al. | 709/237 |
| 2002/0093948 A1 * | 7/2002 | Dertz et al. | 370/355 |
| 2002/0126708 A1 * | 9/2002 | Skog et al. | 370/522 |
| 2002/0126780 A1 * | 9/2002 | Oshima et al. | 375/347 |
| 2002/0137507 A1 * | 9/2002 | Winkler | 455/426 |
| 2002/0188744 A1 * | 12/2002 | Mani | 709/231 |
| 2003/0013483 A1 * | 1/2003 | Ausems et al. | 455/556 |
| 2003/0043985 A1 * | 3/2003 | Wu | 379/144.05 |
| 2003/0045331 A1 * | 3/2003 | Montebovi | 455/566 |
| 2003/0064744 A1 * | 4/2003 | Zhang et al. | 455/522 |
| 2003/0078986 A1 * | 4/2003 | Ayres et al. | 709/217 |
| 2003/0101246 A1 * | 5/2003 | Lahti | 709/221 |
| 2003/0172173 A1 * | 9/2003 | Fenton | 709/231 |

OTHER PUBLICATIONS

Maass, "*Location Aware Mobile Applications Based on Directory Services,*" Proc. MobiCom'97, 1997.

Dawson and Stenerson, "*Internet Calendaring and Scheduling Core Object Specification,*" RFC2445, Nov. 1998.

* cited by examiner

ENVIRONMENT AWARE SERVICES FOR MOBILE DEVICES

FIELD OF THE INVENTION

This invention relates generally to the field of delivering computerized services, and more particularly to providing services to mobile users via a wireless communications network.

BACKGROUND OF THE INVENTION

A large number of systems are known for locating and tracking mobile objects, such as ship, planes, vehicles, etc. Some recent examples include, U.S. Pat. No. 6,298,306, "*Vehicle Locating System Utilizing Global Positioning,*" issued to Suarez, et al. on Oct. 2, 2001, and U.S. Pat. No. 6,348,889, "*Radar Apparatus,*" issued to Ashihara, et al. on Feb. 19, 2002. In general, the prior art systems focus on physical layer aspects of detecting signals in the presence of noise. Current transceiver designs can effectively locate and track objects with an accuracy of several meters.

Advanced systems can reliably locate and track multiple objects with a high degree of precision, see U.S. Pat. No. 6,349,259, "*Navigation Apparatus and Information Generating Apparatus,*" issued to Sato on Feb. 19, 2002, U.S. Pat. No. 6,275,773, "*GPS Vehicle Collision Avoidance Warning and Control System and Method,*" issued to Lemelson, et al. on Aug. 14, 2001, and U.S. Pat. No. 6,133,867, "*Integrated Air Traffic Management and Collision Avoidance System,*" issued to Eberwine, et al. on Oct. 17, 2000. All of these systems are capable of locating and tracking at least one mobile object relative to a stationary object or a mobile object.

The above systems could be adapted for general use and consumer applications. However, prior art systems are not designed for providing personalized services to different users. In recent years, a greater emphasis on personalized services has emerged. Personalized services are customized to the location and preferences of mobile users.

U.S. Pat. No. 5,642,303, "*Time and Location Based Computing,*" issued to Small et al. on Jun. 24, 1997, describes a system that allows users to define their own personal infrastructure by placing beacons at key locations to provide intelligent location awareness. As an advantage, that system does not require a network or server infrastructure, and unlike GPS systems, that system has no line-of-sight restrictions so that it can be used indoors. With beacons placed at various locations, such as in a home or in an office, that system provides users with information based on their locations and preferences.

However, because that system does not make use of existing networks, it is of limited use outside of the users "home area." Location aware services (LAS) would be of greater value if they could be used at locations that are unfamiliar to users.

U.S. Pat. No. 6,331,817, "*Object Tracking Apparatus and Method,*" issued to Goldberg on Dec. 18, 2001, describes a tracking system that includes a tracked object interrogator, a location interrogator and an alarm. The object of that system is to report when an object is not near an expected location, object or person. The system accomplishes this task by tracking an object or a group of objects that may be needed by the user at different times of the day or for different tasks. The tracked object interrogator produces an object identifier, while the location interrogator produces an output corresponding to its proximity relative to a location transducer. An alarm is signaled based on predetermined combinations of the object identifier and location output.

Location services should be carefully distinguished from location aware services. Location services, such as GPS, merely provide positional information, while LAS involve the delivery of customized services to objects and users according to location information.

Figure 1:
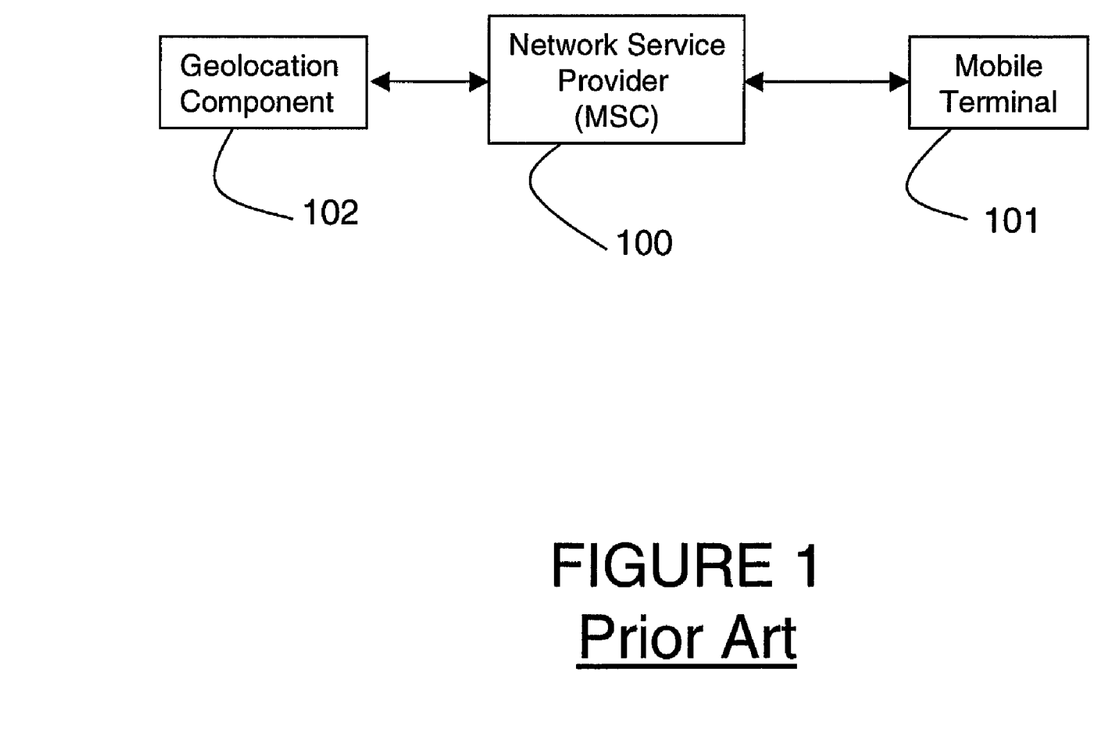
FIG. 1 is a block diagram of a prior art location aware system for mobile communications.

The concept that a networked system can include a database that keeps track of location information is not new. As shown in FIG. 1, Catovic et al., in "*Geolocation Updating Scheme For Location Aware Services in Wireless Networks,*" Proc. MobiCom'01, 2001, describe a mobile switching center (MSC) 100 for locating and tracking mobile terminal devices 101, e.g., cellular telephones, portable computers, personal digital assistants, and the like. The location information is then stored in a "geolocation component" 102. This structure can be used for cellular telephone networks.

Maass, in "*Location Aware Mobile Applications Based on Directory Services,*" Proc. MobiCom'97, 1997, describes a more complete system. A so-called location information server provides location information. Then, customized services are delivered according to user profiles and the location information.

In the context of personalized services, a calendar can be viewed as a rich source of personal information. For one, it can provide information regarding the location of a particular person at a given time. Additionally, a calendar can be used to help schedule events, such as meetings and or appointments. In order to foster an open exchange of calendaring and schedule information across the Internet, a common format for group scheduling and personal information management has been defined, see Dawson and Stenerson, "*Internet Calendaring and Scheduling Core Object Specification,*" RFC2445, November 1998. In that specification, methods that provide support for calendaring and scheduling operations are defined, such as requesting, replying to, modifying and canceling, to-dos and journal entries. The specification also defines a formal grammar for a wide range of descriptive elements used in calendaring and scheduling systems.

As part of the descriptive elements in RFC2445, a method for identifying users is specified, as well as various ways to represent time, such as the date, time of day, duration of an event, and relative time. There are two primary descriptions of location. The first is the GEO component, which is capable of specifying very exact locations, i.e., in terms of latitude and longitude. The values of this component can be determined by a GPS system. The second component is called LOCATION. This component is entered by the user as free text. It is well known that free text is not interoperable in that a description parser cannot easily interpret the semantics of the text. Free text is only useful in applications where the text can be rendered.

In general, prior art location aware services only consider the location and preferences of the user when delivering services. Prior art location aware systems do not consider the total environment in which the service is being delivered. Therefore there is a need to provide more advanced location aware services that effectively customize, adapt and deliver multimedia services considering not only the environment surrounding the user, but also the terminal device, the service provider, and the means that connect the device to the service provider.

SUMMARY OF THE INVENTION

A system delivers multimedia services to mobile devices via a network by first registering a mobile device with a service manager connected to the mobile device via the network. Application service providers are connected to the service manager via the network. Each application service provider is associated with particular multimedia services.

An environment description to be associated with the mobile device is acquired. The environment description includes mobile device capabilities, network conditions, delivery capabilities, user preferences, mobility characteristics, time parameters, frequency and pattern of events parameters, natural environment characteristics, service capabilities, and location parameters.

A particular application service provider is identified according to the environment description, and then selected services provided by the particular application service provider are delivered to the mobile device according to the environment description via the network.

DETAILED DESCRIPTION OF PREFERRED EMBODIMENTS

The present invention provides environment aware services (EAS) to mobile terminal devices. In contrast with prior art location aware system, which only consider user-based location and preferences, the system according to the invention delivers services according to environment descriptions. An environment description is not user centric, but rather all encompassing. For example, environmental factors can consider device capabilities, network conditions, delivery capabilities, user preferences, mobility characteristics, time, frequency and pattern of the events, natural environment characteristics, service capabilities, and location—both absolute and relative. A service manager or application service provider uses the environment description to adapt and deliver personalized and general services. Services include multimedia content, as well as the management of user information.

System Diagram

Figure 2:
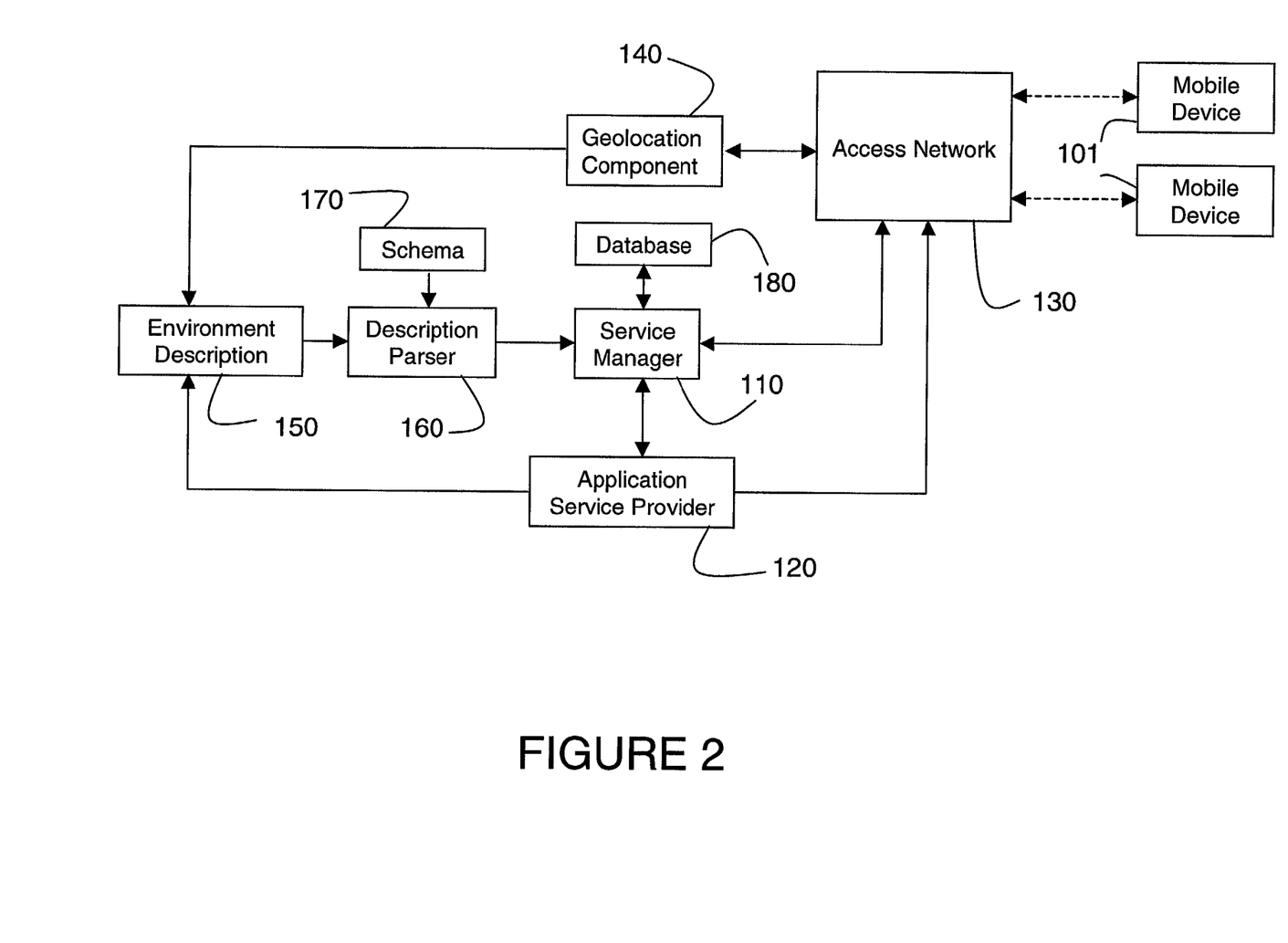
FIG. 2 is a block diagram of an environment aware system for mobile devices according to the invention.

As shown in FIG. 2, mobile terminal devices 101, e.g., cellular phones and portable computing devices, are connected to a service manager (server) 110 and an application service provider (ASP) 120 via an access network 130. The access network 130 can include wired and wireless portions. There can be multiple ASPs, e.g., local businesses, government agencies, etc., in a particular locale. The characteristics of different networks are expressed in terms of capacity, available bandwidth, error characteristics and latency. Also, each mobile device is characterized by different capabilities, such as the multimedia formats that the device can receive, as well as processing and display constraints.

The location of a particular mobile device is determined by a geolocation component 140, which can be part of the network 130. An environment description 150 generated by the ASP 120 includes the location of the mobile device, the characteristics of the device and network, and other factors of the usage environment as described below. A description parser 160 parses the environment description 150 with a schema or grammar 170. This provides a consistent interface which can be processed in a predictable manner, unlike prior art free text which is only commentary. The parsed environment description is available to the service manager 110. The service manager 110 maintains a database 180, which is described in greater detail below. The service manager or ASP 120 allows authenticated devices to access multimedia services stored in the database 180.

Timing Information

In order to provide environment aware services to the mobile devices 101, it is critical that the ASP 120 receives information about the current location of the mobile device. Below, two methods that an ASP 120 can determine the current location of a mobile device are described with reference to FIG. 3.

Figure 3:
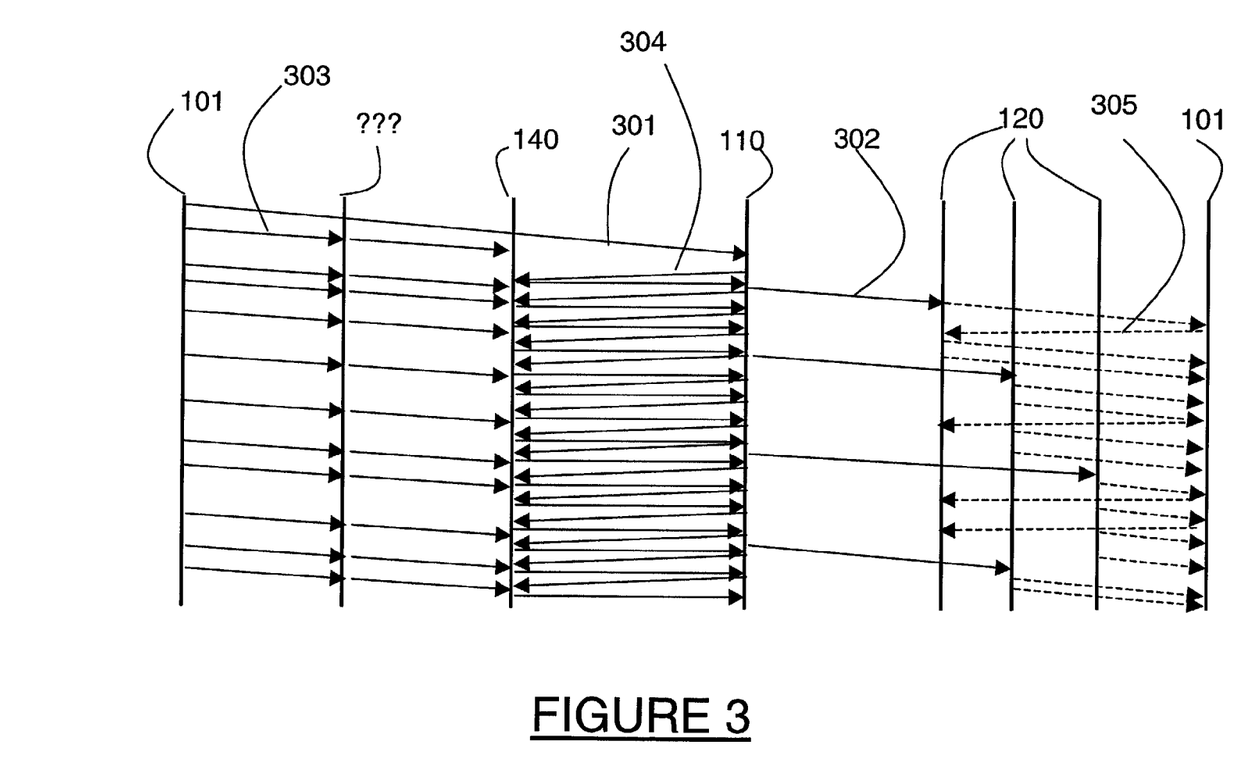
FIG. 3 is an illustration of message timing in the environment aware system according to the invention.

In a first method, the service manager 110 provides information 302 on the current location of a mobile device to an ASP 120 as soon as the mobile device 101 approaches the area that is local to the ASP 120. Of course, it should be understood, that "distance" here is relative to the total environment. The service manager 110 can also provide more specific information to the ASP that is needed for a handshaking process, described in greater detail below. As an example, consider an ASP that delivers services over the cellular wireless network. If the mobile device 101 is in the neighborhood of an ASP 120 and the device is associated with a user that is interested in receiving a particular service, then the service manager 110, which keeps track of the current location of the mobile device, informs the ASP of the mobile device in the coverage area.

After the initial exchange of information with the service manager 110, the ASP 120 establishes a link 305 with the mobile device through the cellular wireless network in order to provide the service. The ASP may do this in one of the following ways: (1) the cellular call is transferred from the service manager 110 to the ASP 120 without disconnecting from the mobile device 101, or (2) the service manager 110 provides the cellular identity of the mobile device to the ASP, e.g., a wireless phone number, and subsequently disconnects its connection to the mobile device. The ASP 120 then establishes a local link 305 with the device to provide the service.

FIG. 3 is a timing diagram of the signaling between the system components of FIG. 2 based on the first scenario above. In FIG. 3, zero time is in the top left corner, and increases going down. The geolocation component 140 and the service manager 110 reside in the access network 130. A mobile device 101 initiates a session, and it first registers 301 with the service manager 110. The service manager 110 keeps track only of the location information of the registered mobile devices 101. A mobile device 101 updates its location information 303 with the access network 130, e.g., a cellular network. The network stores this location information in the geolocation component 140.

Frequency of the location updates between a mobile device 101 and the network 130 are a-periodic. If the mobile device 101 moves slowly, the location updates are generated less frequently compared to those of fast moving mobile devices 101. Therefore as shown in FIG. 3, the frequency of location updates 303 dynamically changes, e.g., according to the mobility characteristic of the mobile device. The mobile device 101 decides when to update its location with the access network 130.

The service manager 110 polls the geolocation component 140 for the location information 303 of the mobile devices 101 that are already registered with the service manager.

The frequency of these communications signaling 304 between the service manager and the geolocation component are also a-periodic. After polling the location information 303, the service manager 110 then sends ASP 120 the information 302 about the mobile devices 101 within ASPs' 120 proximities. The ASP 120 then starts delivering personalized and customized services to the mobile device 101.

In the second method, the ASP 120 determines the location of a nearby mobile device 101 without receiving location information from the service manager 110.

This case is more likely for mobile devices 101 that enter a local wireless network that are associated with its own specialized set of services. In such a case, the ASP 120 and the mobile device 101 agree on a common handshake mechanism in order to start communicating in an orderly fashion. For example, the ASP 120 may advertise the services that it offers. An approaching mobile device may receive that information and initiate a negotiation session if it finds a particular service to be of interest. This can be automated through user preferences, which may either be stored in a remote database, or available locally.

Alternatively, a mobile device may broadcast its existence periodically and the type of services that it may be interested in. As the mobile device enters into an area that is in the range of an ASP, the ASP initiates a handshake and entertains a request for service.

Environment Descriptions

There are a variety of environmental factors that affect the operation of the system according to the invention. Generally, these factors include device capabilities, network conditions, delivery capabilities, user preferences, mobility characteristics, location and time, frequency and pattern of the events, natural environment characteristics, and service capabilities. All of these factors are parseable parameters of the environment description 150.

Device capabilities include hardware properties, such as processor speed and memory capacity, software properties, such as type of operating system, display properties, such as screen resolution, and device profile, which may indicate the media formats that are supported, e.g., MPEG profile/level. If the amount of battery power of a mobile device is a concern, then the battery power level can be input as a temporal device descriptor. The content can be adapted or the bit rate used for delivering a service can be decreased as the device's power decreases.

Network conditions specify delay characteristics, such as end-to-end delay, one-way delay, or delay variation, error characteristics, such as bit-error rate, packet loss or burstiness, and bandwidth characteristics, such as amount of available bandwidth or bandwidth variation. Other types of network descriptions for use in optimally selecting a path given multiple access networks have been described in U.S. patent application Ser. No. 10/079,096, "*Dynamic Optimal Path Selection in Multiple Communications Networks*," filed on Feb. 20, 2002 by Sahinoglu et al.

Delivery capabilities specify the type of transport protocols supported, such as MPEG-2 Systems, TCP/IP and RTP, as well as the types of connections supported, e.g., broadcast, unicast, multicast.

User preferences include filtering and search preferences, browsing preferences, display preferences and QoS preferences, as well as demographic information, such as gender and age.

Service capabilities include a particular user's role, e.g., content creator, service provider, rights owner, billing party or end consumer, as well as the type of service that particular user provides, such as content creation, rights negotiation, billing, content adaptation and transcoding, use of the network and content consumption. Assuming that a particular user is the right owner or content creator, the environment description can also include the permissible types of adaptations that are allowed, e.g., the bit-rate should not be less that 2 Mb/sec, or the spatial resolution of a video should not be reduced by more than a factor of two.

Natural environment characteristics include location, such as GPS coordinates and locale, the type of location, e.g., indoor, outdoor, home, or office, the velocity and trajectory of the mobile device, the illumination properties of the device, the time and date at a specific location, and duration at a location. The location can be determined by the mobile device itself and this information is sent to the geolocation component and updated as described for the timing diagram in FIG. 3. These are significant descriptions to support location-aware services and elaborated on in more detail below.

Mobility characteristics include the velocity and trajectory of the mobile device, as well as other mobility characteristic of a terminal that can be deduced from the history of location information and computed by the service manager. Methods for tracking the mobility characteristics of mobile terminals can be based on user/device classifications, e.g., pedestrian, highway vehicle driver, or urban vehicle driver. For example, the mobility characteristics of mobile terminals can be differentiated from probability distribution functions and power spectrum of signals. Additionally, another determinant factor of the trajectory and mobility characteristics of a mobile terminal is the environment itself, which is distribution of highways, highway traffic volume, distance to malls, shopping centers, etc.

Time-location descriptions include the description of the time, date or duration at a specific location, where both absolute and relative time can be specified. The relative time can be related to the local time difference between the locations of two mobile terminals, between the local time of a mobile terminal and the local time of the application service provider, or it can be related to the time difference between two mutual events that are crucial in scheduling and ordering of services. Several instances that exploit the description of relative distance are possible.

Deliver service S to a mobile device M only if event X1 occurs T time units after event X2 takes place.

Deliver service S to a mobile device M1 only if the difference between its local time and the local time of a mobile terminal or application service provider M2 is greater/less than T1 time unit.

Deliver service S to a mobile device M1 with time unit ST1 for duration DT, where ST1 and DT are times associated with the service or content being delivered, not with the user. Service is paused, but then service S resumes from the previous time ST1+DT, i.e., where the user last left off. This enables a user to continue service from the place of interrupted service. This is important for users that choose to listen to an audio book, or watch a movie, in parts or over various days.

Deliver service S if the time zone difference between the locale of mobile devices and an application service provider is within a specified threshold.

Deliver service S to mobile device M if the mobile terminal stays at its current location for more than T time units.

Relative distance of a mobile terminal to another mobile terminal or a local ASP is used as another environment descriptor. Computation of the relative distance may require the knowledge of GPS coordinates, city, state, zip code, and altitude information. Relative distance is useful for event scheduling and feedback to the user. Some interesting applications are, interactive map-based applications, interactive games, collision avoidance systems based on promising mobile ad-hoc networks and sensor networks technologies to be embedded in vehicles.

Units of relative distance can be either scalar or vector. Scalar units may be in terms of distance metrics from meters to miles range and/or number of objects between two mobile terminals, between a mobile terminal and a service delivery location. Vector units also include the direction of movement of a mobile terminal, e.g., South-1Mile, 2 gas stations to the north, etc.

For the accuracy of the relative distance, the measurement and calculations are updated. If the updates are periodic, then this is referred to as an update frequency; on the other hand, if the updates are a-periodic, it is referred to as an update pattern. The update frequency or pattern can be adjusted to trade-off the accuracy of the relative distance information with the signaling load. Slow updates may result in undesired delivery of relative distance-based location aware services, even if a relative distance constraint has not been satisfied since the last update.

Granularity of relative distance is another important attribute, and therefore the network or service manager can determine a quantization of the granularity, either dynamically or statically. A high granularity requires more frequent updates.

Frequency and pattern of the events are considered as part of the environment descriptions. Frequency within the context of environment aware services can be defined as the occurrence of events per unit time, considering past, current or future events. Frequency defines how often an event occurs and reveals the statistics of the events based on the environment, such as on-line, in office, at home, accessing content, traveling, etc. This environment description can be generalized to other probabilistic models, e.g., for prediction purposes. The pattern description is defined as the sequence or repetition of events, and has the following attributes: periods of events, durations of events, spatio-temporal relations of events, and composition of events.

Service Manager

The service manager 110 is responsible for managing the connection that delivers services to the mobile devices 101. This connection is called a "session," and is handled by the service manager from the time a session is initiated to the time a session is terminated. In the following, a typical session is detailed.

First, the mobile device or service manager initiates a session through a registration process. Before service begins, the session manager can authenticate the mobile device. The session manager collects an environment description which is a collection of descriptions derived from the mobile device, network environment, application service providers, geolocation component, and user profile, as described in detail above.

Based on environment descriptions from both the application service providers and the mobile device, the session manager attempts to make a "best match" by comparing the environment descriptions received by these various entities. If there is a successful match, then the session manager negotiates such things as content transfer and billing between the mobile device, application service provider, and itself. If a good match cannot be found, then the session manager attempts to satisfy the content transfer itself.

Either the mobile device or service manager can terminate the session. The service manager is responsible for cleaning-up after termination, e.g., closing any open files, calculating a total bill, etc. Certain aspects of this process are elaborated on below consider the perspective of the application service provider.

Database

The database 180 stores a variety of information such as user profiles, user statistics, multimedia content, server profiles, and security information. A user profile can include personal data, such as credit card information and banking accounts, billing options, and a user's preferences, such as preferred services and graphical user interfaces.

Statistics refer to information that pertains to a user's availability, such as where and when the user is online, as well as the type of content the user has been viewing. In RFC2445, cited above as prior art, certain aspects of the user's availability can be sufficiently specified in a standardized format, such as the date and time related to the schedule of an individual or group. The user can provide input to these statistics as well. The service manager 110 establishes the user availability by using this input as well as using statistics that it has collected.

Content is also stored in the database. Content can include location specific weather reports, maps associated with such reports, stocks quote data and images that render a moving stock ticker. In general, all types of multimedia, including audio, video, graphics and text data can be stored in the database 180.

The server profile includes a list and references to available services on a particular server. It should be noted that a user is not limited to the services contained within a particular server, i.e., the user may discover new services in different environments that are encountered. The server profile may also include a network access description for alternate paths, along with their associated costs. Additionally, the server profile would describe the server capabilities, in general. For example, the type of content adaptation it is capable of performing, the maximum bit-rates that it can deliver or average latency as a function of the number of active users.

The service manager can update the database periodically by retrieving current information from mobile devices and application service providers. For example, the service manager can retrieve current environment information from another database maintained by the geolocation component, or it may discover a new machine capable of performing a specific type of content adaptation.

Application Service Provider

The Application Service Provider (ASP) 120 is responsible for providing services to mobile devices, which includes delivering multimedia content. Multiple ASPs, e.g., gas stations, hotels, and restaurants, provide different or similar services to mobile devices in a given area. The type of wireless access network that a device is connected to may affect the service that it can receive. For example, if a mobile device is receiving services from an ASP over a cellular wireless network, then the device is also able to receive services from connected ASP's that are not necessarily located in the same geographic area. On the other hand, if a wireless system with a restricted or limited range is used for providing service, e.g., systems based on IEEE 802.11 or Bluetooth technology, then only the local mobile devices roaming in the effective range of the system can receive service.

In order to provide environment aware services to a mobile device, the service determines the current location of the mobile device, the means to access it, its device capabilities, the type of service or contents it may be interested in, and the price and billing options that are available. The service manager can provide the ASP's with most of the required information. An ASP, however, may be able to get some of that information by its own means. The ASP may have to perform the authentication of the mobile device, either directly or indirectly, i.e. by means of the service manager. Such aspects of the system are described in more detail below.

Service Negotiation

The service manager 110 provides information to an ASP on the services that the mobile device may be interested in. Before a service is provided to the mobile device, the ASP and the mobile device must agree on the type of services or contents that the mobile device is interested in, acceptable Quality of Service, and mobile device capabilities. Typically, the service manager performs this negotiation on behalf of the mobile device; however, it may also be done directly between the ASP and the mobile device.

Regardless of whether the device or service manager is negotiating with the ASP, the price to be charged by the ASP, along with the billing/payment method to be employed can be agreed upon as well. By doing these tasks on behalf of the device, the service manager, in fact, authenticates the device for the ASP. It is quite possible that an ASP has a local authenticator available in order to facilitate the direct payment from the mobile device rather than charging to the service manager. In certain situations that mechanism may be more desirable or feasible. For example, this may reduce the transaction cost, guarantee the satisfaction of the ASP, or the mobile device may not want to involve the service manager in some transactions. In such a case, the selection for the service, price negotiation, and the decision on the payment method is made between the ASP and mobile device.

Content Delivery

After the service is selected, price is negotiated, and billing method agreed upon by the ASP, service manager and the mobile device, the ASP provides service to the mobile device. The service may involve the purchase of goods, e.g., gas, drink, food, book, or it may involve downloading and playing content, e.g., weather reports, traffic reports, and various forms of multimedia content, in general.

In order to download and play an audio or video stream the ASP is responsible for delivering content that matches the capabilities of the mobile device. In the event that content adaptation is needed, the ASP may have the ability to perform the adaptation locally; if the ASP does not have this ability, the service manager may have the ability to adapt the content or will direct the ASP to send the content elsewhere to be adapted. In the worst case, the ASP will not be able to deliver content to the device, in which case, the session to provide actual service should not initiate. As described below, the content adaptation and delivery process can be performed in several ways.

In a first method, the ASP includes or has accessibility to a content adaptation engine that is capable of adapting the contents into a format that is suitable for the mobile device. In this case, the ASP receives the device capability description from the service manager and passes this information to content adaptation engine. The adapted stream is then passed to the mobile device via the wireless link.

In a second method, the ASP does not have access to the specific content adaptation engine that is needed for the particular task at hand. Rather, the service manager has access to the content adaptation engine, or knows where one can be found. If the mobile device does not have a capability to play the contents in its current format, the ASP must either transport the contents to the service manager, or be directed by the service manager as to where the content should be sent for adaptation. The service manager assumes the responsibility to ensure that the contents are adapted in a suitable format for the mobile device to consume.

The service manager can perform this operation locally or send the content to another server that does have this capability. Ultimately, the adapted stream is passed back to the ASP, which in turn, forwards it to the mobile device over the wireless link. It is desirable that the ASP and the service manager are connected by a highly efficient wired link. It is further assumed that Quality of Service parameters, such as latency and perceived quality, are kept to at satisfactory levels for the user.

Apart from providing services to the mobile terminals, an ASP also provides the system with valuable information on the local environment in its own area of operation. That may include, but not restricted to, the time and environment related information, such as temperature, precipitation, local networking infrastructure, type of dominant local activities, e.g. a tourism, business, learning, and any major events being observed in that area. Such information may have a profound effect on the service provision to the mobile terminals in that area. It is partially used to keep the environment descriptions updated. These descriptions, as stated earlier, are used for recording the spatio-temporal variations across the covered area, which in turn, is a vital input to the content adaptation engine. These descriptions, along with other information, are also used by the service manager to identify and offer a unique set of services to the mobile terminals in a given area.

Content Adaptation Engine

The operation of the content adaptation engine is affected not only by environment description, but also the content description. Such descriptions include transcoding hints as specified in U.S. patent application Ser. No. 09/547,159, "Video transcoding using syntactic and semantic clues," filed on Jun. 15, 1999, by Vetro et al., or ISO/IEC 15938-5:2001, "Information Technology—Multimedia Content Description Interface: Part 5 Multimedia Description Schemes."

There are a wide variety of resource adaptation engines that can be used with the present invention. For video transcoding, the content adaptation engine may consider bit rate reduction, see for example "Architectures for MPEG compressed bitstream scaling," IEEE Transactions on Circuits and Systems for Video Technology, April 1996 by Sun et al., and spatial resolution reduction, see for example, U.S. patent application Ser. No. 09/853,394, "Video Transcoder with Spatial Resolution Reduction," filed on May 11, 2001 by Vetro et al. Other types of adaptation may include a generation of video summaries, see for example U.S. patent application Ser. No. 09/845,009, "Method for summarizing a video using motion and color descriptors," filed on Aug. 9, 2000 by Divakaran, et al., or changing the compression format, e.g., from MPEG-2 to MPEG-4.

In U.S. patent application Ser. No. 09/496,706, "Adaptable Compressed Bitstream Transcoder," filed on Feb. 2, 2000 by Vetro et al., incorporated herein by reference, a transcoder operates in any one of a plurality of conversion modes. A manager is configured to select a particular mode depending on semantic content of the bitstream and network characteristics. The system also includes a content classifier to determine the content characteristics, and a model predictor to determine the network characteristics, and input is received on the user device characteristics. An integrator of the manager generates optimal rate-quality functions to be used for selecting the particular conversion model for the available bit-rate of the network. This invention can use any known methods for content adaptation. The specific abilities of the content adaptation engine that are embedded into a particular device depend highly on the target application and target adaptation device.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for delivering multimedia services to mobile devices via a network, comprising:
   a service manager for registering a mobile device connected via the network;
   a plurality of application service providers connected to the service manager via the network, each application service provider associated with particular multimedia services;
   means for acquiring an environment description to be associated with the mobile device, wherein the environment description includes mobile device capabilities, network conditions, delivery capabilities, user preferences, mobility characteristics, time parameters, frequency and pattern of events parameters, natural environment characteristics, service capabilities, and location parameters;
   means for identifying a particular application service provider according to the environment description; and
   means for delivering selected services provided by the particular application service provider to the mobile device according to the environment description via the network.

2. The system of claim 1 wherein the location parameters are absolute and relative.

3. The system of claim 1 wherein the time parameters are absolute and relative.

4. The system of claim 1 wherein the services include delivery of multimedia content and management of user information.

5. The system of claim 1 further comprising a geolocation component in the network.

6. The system of claim 1 further comprising:
   a description parser configured to parse the environment description with a schema.

7. The system of claim 1 further comprising:
   means for providing a location of the mobile device to the particular application service providers.

8. The system of claim 1 wherein the particular application service provider delivers the selected services to the mobile device.

9. The system of claim 1 wherein a location of the mobile devices is updated according to a velocity and trajectory of the mobile device.

10. The system of claim 1 wherein the mobile device capabilities include hardware properties, software properties, display properties, and a device profile.

11. The system of claim 1 wherein the mobile device capabilities include an amount of battery power of the mobile device.

12. The system of claim 11 wherein a rate of delivery of the selected services depends on the amount of battery power.

13. The system of claim 1 wherein the network conditions include delay characteristics, error characteristics, and bandwidth characteristics of the network.

14. The system of claim 1 wherein the delivery capabilities specify a type of transport protocol and a type of connection.

15. The system of claim 1 wherein the user preferences include filtering and search preferences, browsing preferences, display preferences and QoS preferences, and demographic information.

16. The system of claim 1 wherein the service capabilities include a role of a user of the system.

17. The system of claim 1 wherein the natural environment characteristics include a location, a type of location, a velocity and trajectory of the mobile device, illumination properties of the mobile device, time and date at a specific location, and duration at the location.

18. The system of claim 1 wherein the mobility characteristics include a velocity and trajectory of the mobile device.

19. The system of claim 1 wherein the delivery of the selected services depends on occurrences of events.

20. The system of claim 1 wherein the delivery of the selected services depends on a difference between a first and second time.

21. The system of claim 1 wherein the delivery of selected services for second and subsequent times depends on a previous time.

22. The system of claim 1 wherein the delivery of the selected services depends on a length of stay at a specific location by the mobile device.

23. The system of claim 1 further comprising:
   a database connected to the service manager.

24. The system of claim 23 wherein the database stores user profiles, user statistics, multimedia content, server profiles, and security information.

25. The system of claim 1 wherein the selected services are adapted according to the environment description.

26. The system of claim 25 further comprising:
   a content adaptation engine connected to the service manager.

27. A method for delivering multimedia services to mobile devices via a network, comprising:
   registering a mobile device with a service manager connected to the mobile device via the network;
   acquiring an environment description to be associated with the mobile device, wherein the environment description includes mobile device capabilities, network conditions, delivery capabilities, user preferences, mobility characteristics, time parameters, frequency and pattern of events parameters, natural environment characteristics, service capabilities, and location parameters;
   identifying an application service provider according to the environment description; and
   delivering selected services provided by the application service provider to the mobile device according to the environment description via the network.

* * * * *